United States Patent
Avasarala et al.

(10) Patent No.: US 10,644,893 B2
(45) Date of Patent: May 5, 2020

(54) ENSURING CORRECTNESS OF SESSION IDENTIFIERS IN CALL DURATION RECORDS IN MOBILE NETWORKS

(71) Applicant: AT&T Intellectual Property I, L.P., Atlanta, GA (US)

(72) Inventors: Ranjit Kumar Avasarala, Buffalo Grove, IL (US); Mulugheta Zelleke, Plainfield, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/055,474

(22) Filed: Aug. 6, 2018

(65) Prior Publication Data

US 2020/0044878 A1    Feb. 6, 2020

(51) Int. Cl.
| | | |
|---|---|---|
| *H04M 11/00* | (2006.01) | |
| *H04L 12/14* | (2006.01) | |
| *H04W 4/24* | (2018.01) | |
| *H04M 15/00* | (2006.01) | |
| *H04L 29/06* | (2006.01) | |

(52) U.S. Cl.
CPC ........ *H04L 12/1403* (2013.01); *H04L 65/102* (2013.01); *H04L 65/1006* (2013.01); *H04M 15/41* (2013.01); *H04M 15/8228* (2013.01); *H04W 4/24* (2013.01)

(58) Field of Classification Search
CPC ............... H04L 12/1403; H04L 65/102; H04L 65/1006; H04W 4/24; H04M 15/8228; H04M 15/41
USPC ........................................................ 455/406
See application file for complete search history.

(56) References Cited

U.S. PATENT DOCUMENTS

| | | |
|---|---|---|
| 7,474,645 B2 | 1/2009 | Lundin |
| 7,805,126 B2 | 9/2010 | Koskinen et al. |
| 7,869,787 B2 | 1/2011 | Koskinen et al. |
| 8,218,742 B2 | 7/2012 | Cai et al. |
| 8,271,667 B2 * | 9/2012 | Hoshino ........... H04L 29/06027 370/260 |
| 8,289,885 B2 | 10/2012 | Cai et al. |
| 8,301,114 B2 | 10/2012 | Cai et al. |

(Continued)

OTHER PUBLICATIONS

Eyermann, et al., "Diameter-based Accounting Management for Wireless Services," WCNC proceedings 2006, 7 pages.

(Continued)

*Primary Examiner* — Khoi H Tran
*Assistant Examiner* — B M M Hannan
(74) *Attorney, Agent, or Firm* — Amin, Turocy & Watson, LLP

(57) ABSTRACT

A mechanism to insert a correct call identifier as a session identifier in a accounting request (AR) record and a mechanism for a charging control function (CCF) device to check the value and generate an error as required. A method can comprise receiving a session initiation protocol packet representing a first attribute value pair; based on the session initiation protocol packet, checking for an existence of an identity between a first field associated with the session initiation protocol packet and a second field associated with a second attribute value pair; and in response to a result of the checking being that the existence of the identity is not determined to be presents between the first field and the second field, updating a third attribute value pair.

20 Claims, 10 Drawing Sheets

(56) References Cited

U.S. PATENT DOCUMENTS

| | | | |
|---|---|---|---|
| 8,611,851 B2 | 12/2013 | Sharma et al. | |
| 8,737,953 B2 | 5/2014 | Sharma et al. | |
| 8,812,382 B2 | 8/2014 | Koskinen et al. | |
| 8,977,233 B2 | 3/2015 | Sharma et al. | |
| 9,161,199 B1 | 10/2015 | Sharma | |
| 9,438,746 B2 | 9/2016 | Cai et al. | |
| 9,438,748 B2 | 9/2016 | Sharma | |
| 9,560,211 B2 | 1/2017 | Sharma | |
| 9,775,018 B2 | 9/2017 | Li et al. | |
| 9,883,052 B2 | 1/2018 | Sharma et al. | |
| 9,942,415 B2 | 4/2018 | Sharma | |
| 2004/0167834 A1 | 8/2004 | Koskinen et al. | |
| 2004/0260819 A1* | 12/2004 | Trossen | H04L 29/06 709/229 |
| 2005/0232253 A1* | 10/2005 | Ying | H04L 29/06027 370/356 |
| 2006/0253538 A1* | 11/2006 | Jung | H04L 65/605 709/206 |
| 2007/0047518 A1* | 3/2007 | Lin | H04J 3/1682 370/352 |
| 2007/0103117 A1* | 5/2007 | Burghardt | H04L 12/14 320/119 |
| 2007/0140299 A1* | 6/2007 | Hofmann | H04L 29/06 370/486 |
| 2008/0095158 A1* | 4/2008 | Nakazawa | H04L 12/64 370/389 |
| 2008/0291905 A1* | 11/2008 | Chakravadhanula | H04L 29/06027 370/355 |
| 2008/0316998 A1* | 12/2008 | Procopio | H04M 7/123 370/352 |
| 2009/0037453 A1* | 2/2009 | Kemmler | G06F 17/3089 |
| 2009/0111458 A1* | 4/2009 | Fox | H04W 84/042 455/422.1 |
| 2009/0327398 A1* | 12/2009 | Campbell | H04L 67/289 709/202 |
| 2010/0150328 A1* | 6/2010 | Perreault | H04L 9/3226 379/142.04 |
| 2011/0077058 A1 | 3/2011 | Cai et al. | |
| 2012/0221445 A1 | 8/2012 | Sharma | |
| 2014/0092782 A1* | 4/2014 | Shiga | H04L 12/413 370/259 |
| 2014/0323083 A1* | 10/2014 | Caldwell | H04M 15/41 455/406 |
| 2015/0055446 A1* | 2/2015 | Avula | H04W 56/002 370/216 |
| 2015/0117306 A1* | 4/2015 | Das | H04L 65/1069 370/328 |
| 2015/0148003 A1* | 5/2015 | Piro, Jr. | G06Q 30/04 455/406 |
| 2015/0229778 A1 | 8/2015 | Sharma et al. | |
| 2015/0244874 A1 | 8/2015 | Tornkvist et al. | |
| 2016/0094722 A1* | 3/2016 | Sharma | H04M 15/31 455/406 |
| 2016/0165068 A1 | 6/2016 | Sharma | |
| 2018/0124253 A1* | 5/2018 | Xu | H04W 4/24 |

OTHER PUBLICATIONS

Koutsopoulou, et al., "Charging, Accounting and Billing Management Schemes in Mobile Telecommunication Networks and the Internet," IEEE Communications Surveys & Tutorials • First Quarter 2004, vol. 6, No. 1, 9 pages.

Koutsopoulou, et al., "A platform for charging, billing, and accounting in future mobile networks," Computer Communications 30 (2007), pp. 516-526.

Kuhne, et al., "Charging and Billing in Modern Communications Networks—A Comprehensive Survey of the State of the Art and Future Requirements," IEEE Communications Surveys & Tutorials, vol. 14, No. 1, First Quarter 2012, 23 pages.

Morariu, et al., "An Integrated Accounting and Charging Architecture for Mobile Grids," © 2006 IEEE, 10 pages.

* cited by examiner

ENSURING CORRECTNESS OF SESSION IDENTIFIERS IN CALL DURATION RECORDS IN MOBILE NETWORKS

TECHNICAL FIELD

The disclosed subject matter provides a mechanism to insert a correct call identifier as a session identifier in an accounting request (AR) record and a mechanism for a charging control function (CCF) device to check the value and generate an error as required.

BACKGROUND

Currently charging trigger function (CTF) devices, such as session initiation protocol application server devices that handle multiple session initiation protocol (SIP) transactions pertaining to a particular calling party will occasionally insert a wrong value in an outgoing session identifier attribute value pair (AVP) in an outgoing accounting request (ACR) record. When such an accounting request (ACR) record is received by a charging control function (CCF) device, the CCF device can be expecting a different value as the session identifier, as such the mismatch can lead to a bad record being generated by the CCF device. Currently, there is no mechanism within the CCF device to indicate that an error has occurred.

DETAILED DESCRIPTION

Figure 1:
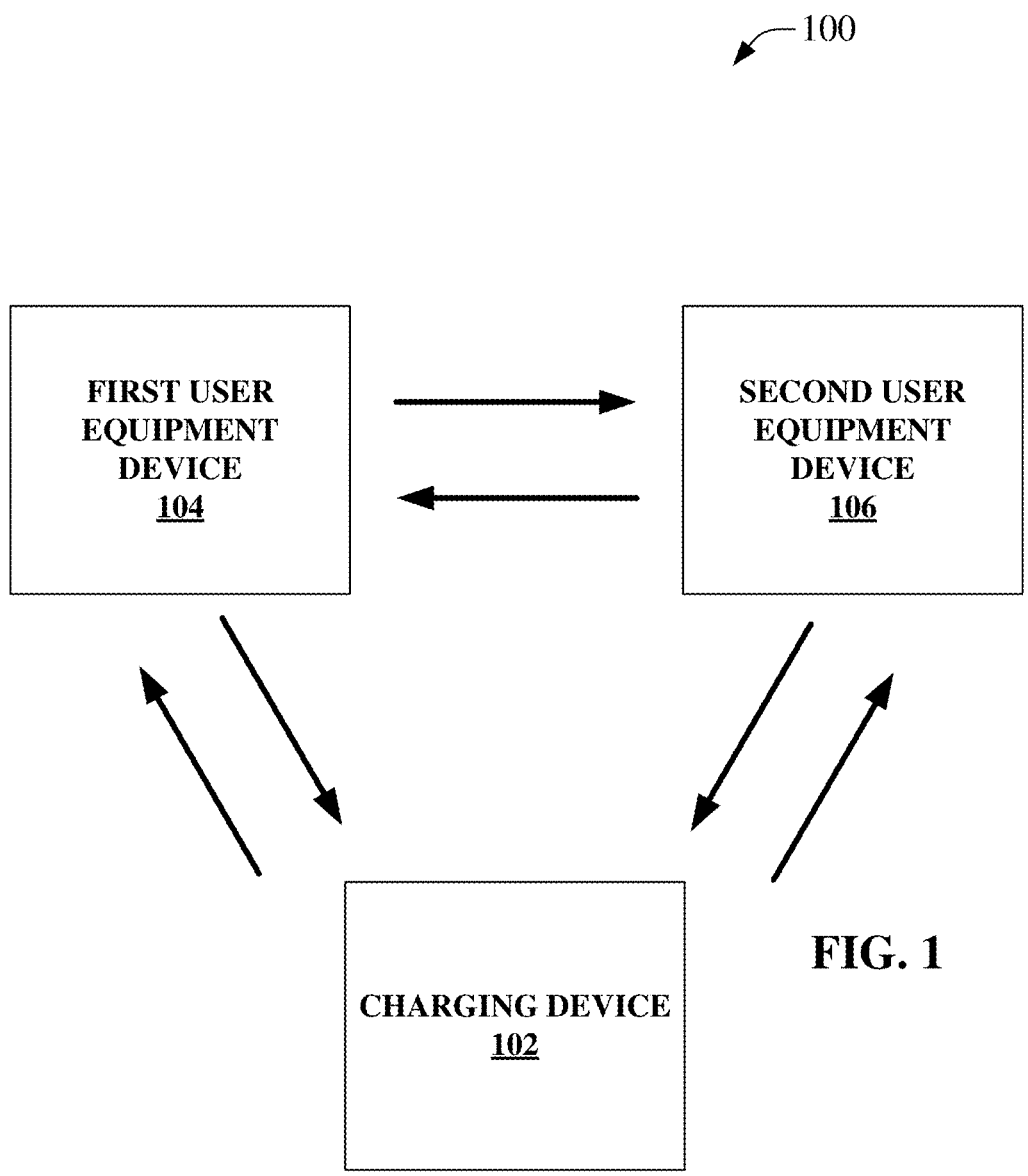
FIG. 1 is an illustration of a system for ensuring correctness of session identifiers in call duration records in mobile networks, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

It should be realized and appreciated by those of ordinary skill that the foregoing non-limiting example application is merely an illustration of a use of the disclosed and described solution and is provided only for the purposes of exposition. The described and disclosed subject matter is therefore not limited to the foregoing example application, but can find applicability in other more generalized circumstances and use applications.

An offline charging system for ensuring correctness of session identifiers in call duration records in mobile networks, can comprise performing the following functions: a charging trigger function (CTF), and a charging control function (CCF). The CCF can comprise performing a charging data function (CDF) and a charging gateway function (CGF). Performance of the CDF typically gathers a call duration record/call data record (CDR) and performance of the CGF generally transfers CDRs to a billing system device.

Performance of the CTF typically generates diameter accounting request (ACR) messages that can be used to populate a session ID with a session initiation protocol (SIP) session Call-ID in the case of SIP sessions and thereafter to send ACR messages to the CCF over a first interface (e.g., Rf interface).

The CCF, in response to receiving an ACR, can typically store a session Call-ID and generate a CDR for the particular session. The CDRs can then be sent to a billing system device by the CGF over a second interface (e.g., Bi interface).

Generally, the CTF (e.g., the Internet Protocol Multimedia Subsystem (IMS) network core elements such as the call session call function (CSCF) devices, media resource function (MRF) devices, border gateway control (BGC) devices, application server devices, and the like) can generate diameter ACR requests with session-IDs directed towards the CCF. When the CTF generates an ACR message it can occasionally fail to ensure the correctness of the session-ID.

For instance, consider the following situation where a first user (user A) using a first user equipment device (e.g., a first mobile cellular device) with a first call identifier (Call-ID1) calls a second user (user B) using a second user equipment device (e.g., a second mobile cellular device). Because the second user is busy (e.g., user B is busy on another call) the second user equipment device rejects the first user's call with SIP error code (e.g., error code 486). The first user, in response to receiving the SIP error code, now calls (or in response to generation of the error code is directed to) an application server device (e.g., a voicemail service operational on the application server device) with a second call identifier (Call-ID2). The application server device (or the voicemail service operational on the application server device) thus mistakenly uses the second call identifier (e.g., Call-ID2) as the session-ID in the ACR rather than using first call identifier (e.g., Call-ID1) as the session-ID in the ACR. In such an instance, the device executing the CTF sends a wrong value in the session-ID attribute value pair (AVP) while the device executing the CCF would be expecting a particular value (e.g., Call-ID1) as the session-ID rather than the value that it actually receives (e.g., Call-ID2). This mismatch can thus lead to a bad record being maintained which in turn can lead to erroneous and/or superfluous accounting call records being stored to accounting database devices, significant processing overheads being incurred due to the unnecessary processing of erroneous and/or extraneous records, and the like. The subject disclosure therefore is able to curtail and/or minimize the number(s) of erroneous records that need to be persisted to storage (e.g., a database device of a grouping of database devices that can comprise, for example a distributed accounting database), as well as can reduce the amount of processing necessary to process the accounting records as a consequence of the reduction in erroneous and/or extraneous records being utilized for such purposes.

Thus, in order to ensure the correctness of session identifiers in call duration records (e.g., ensure correct values of session-IDs are included in ACRs) a SIP back 2 back user agent (B2BUA) device can ensure that outgoing-session-ID values are correct. For example, the if there are two disparate Call-IDs that appear in quick succession (e.g., within a defined or definable time period) from a call being placed from a particular calling number (e.g., from identical calling party) to a receiving number (e.g., identical receiving party) and one of the calls is not answered (e.g., because the receiving party is busy or in response to an error code being returned) while the other was forwarded to the voicemail application service, then the B2BUA device generally should use the Call-ID of the call that was forwarded to voicemail as the outgoing-session-ID.

The foregoing can be accomplished by a CCF device, where upon receiving an ACR with a outgoing-session-ID AVP for a SIP session, the CCF device should compare the received value of the SIP Call-ID included in received outgoing-session-ID AVP with an expected value of the SIP Call-ID that can have been received in an earlier outgoing-session-ID AVP. The expected value typically would be the Call-ID of a particular call that corresponds to the one that was forwarded to the voicemail service.

If there is an error in the comparison (e.g., a mismatch) between the received value of the SIP Call-ID and the expected value of the SIP Call-ID, then the CCF device can note the error and populate the ACA acknowledgment response with a diameter error (e.g., DIAMETER_INVALID_SESSION_ID) and can also add the expected value in an error message AVP that then can subsequently be stored to a database device associated with a distributed aggregation of database devices.

In accordance with the forgoing, illustrated in FIG. 1 is a system for ensuring correctness of session identifiers in call duration records in mobile networks, in accordance with various embodiments is set forth and disclosed herein. As illustrated in FIG. 1. a charging device 102 can be in operative communication with first user equipment device 104 and second at user equipment device 106. Additionally, first user equipment device 104 can be in communication with a second user equipment device 106. As depicted, in this instance, first user equipment device 104 can initiate a communication session with the second user equipment device 106. The first user equipment device 104, on initiating the communication session with the second user device 106, can be associated with a first call identifier (e.g., Call-ID1). Nevertheless, for the purposes of illustration, because the second user equipment device 106 is determined to busy (e.g., the user of the second user equipment device 106 is using the second user equipment device 106) the second user equipment device 106 rejects the call initiated by the first user equipment device 104 with a SIP error code (e.g., error code 486). The first user equipment device 104, in response to receiving the SIP error code, now calls (or in response to generation, or on receipt, of the error code is directed to) an application server device (e.g., a voicemail service operational on the application server device) with a second call identifier (e.g., Call-ID2). The application server device (or the voicemail service operational on the application server device) thus mistakenly uses the second call identifier (e.g., Call-ID2) as the session-ID in the ACR, rather than using the first call identifier (e.g., Call-ID1) as a session-ID in the ACR. In this instance, charging device 102 (e.g. the device executing the CTF) will send a wrong value in the session-ID (AVP) while the device executing the CCF (e.g., for ease of exposition also charging device 102) would be expecting a particular value (e.g., Call-ID1) as a session-ID rather than the value that was actually received (e.g., Call-ID2). This mismatch can lead to a bad record, which in turn can lead to erroneous and/or superfluous accounting records being stored and maintained on accounting database devices, and significantly increasing processing overheads incurred due to the need to perform unnecessary processing of these erroneous and superfluous records.

In order to obviate and to ensure the correctness of session identifiers in call duration records (e.g., to ensure correct values of session-IDs are included in ACRs) a SIP back 2 back user agent (B2BUA) device (e.g., charging device 102) can ensure that outgoing-session-ID values are correct. Charging device 102, in response to determining that two disparate Call-IDs have been received in quick succession (e.g., within a defined or definable period of time) from a call being placed from a particular calling number (e.g., from an identical calling party) associated with a calling user equipment device (e.g., first user equipment device 104) to a receiving number (e.g., to identical receiving party) with a receiving user equipment device (e.g., a second user equipment device 106) and one of the calls is not answered while the subsequent call is forwarded to voicemail as the outgoing session-ID. In accordance with one or more embodiments, the receiving user equipment device (e.g., second user equipment device 106), for example in the initial instance, can respond with an error code that can have been generated based on, as a function of, or in response to the receiving user equipment device having determined that it is in an unavailable state (e.g., in a state of servicing another call, having been placed, by the user, in a do not disturb state; in a hiatus state; in a minimal/reduced power usage mode; being placed, by the operating system operational on the device, in a powered down/power off state, . . . ), and in the immediately subsequent instance, the receiving user equipment device (e.g., second user equipment device 106) can direct the subsequent call to a voicemail service operational on an application server device (not shown) as the outgoing-session-ID.

Charging device 102 can facilitate the foregoing by, upon receiving an ACR with an outgoing-session-ID AVP for a SIP session, comparing the received value of the SIP Call-ID included in the received outgoing-session-ID AVP with an expected value of the SIP Call-ID that can have been received in an earlier outgoing-session-ID AVP. As has been noted earlier, the expected value typically would be the Call-ID of a particular call that corresponds to the one that was forwarded to the voicemail service.

If there is an error in the comparison (e.g. a mismatch) between the received value of the SIP Call-ID and the expected value of the SIP Call-ID, then charging device 102 can note the error and populate an ACA acknowledgment response with a diameter error, such as DIAMETER_INVALID_SESSION_ID. Additionally, charging device 102 can also add the value that was expected in an error message AVP, wherein the error message AVP can be stored to a database device associated with a distributed aggregation of database devices.

Charging device 102, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise charging device 102 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous earth orbit, and/or orbiting around one or more planetary bodies, and the like.

Similarly, one or more of first user equipment device 104 and/or second user equipment device 106, for purposes of elucidation, can comprise any type of mechanism, machine, device, facility, apparatus, and/or instrument inclusive of a processor, and/or is capable of effective and/or operative wired and/or wireless communication with a network topology. Illustrative mechanisms, machines, apparatuses, devices, facilities, and/or instruments can include server class computing machines and/or databases, tablet computing devices, handheld devices, laptop computers, notebook computers, desktop computers, cell phones, smart phones, consumer appliances and/or instrumentation, industrial devices and/or components, devices and/or appliances associated with aerospace vehicles, consumer devices and/or components associated with automotive vehicles, handheld devices, personal digital assistants, multimedia Internet enabled phones, multimedia players, and the like.

Figure 2:
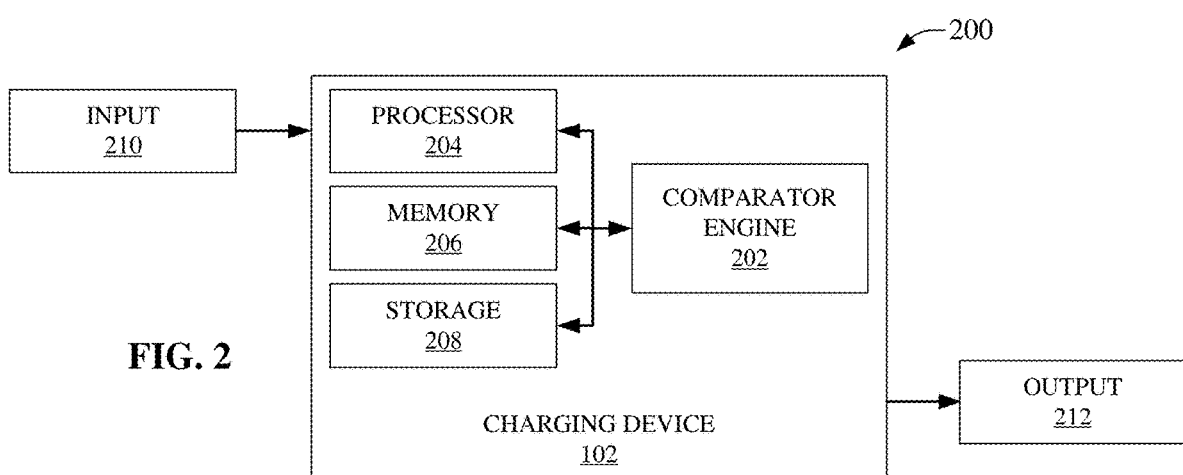
FIG. 2 is a further depiction of a system for ensuring correctness of session identifiers in call duration records in mobile networks, in accordance with aspects of the subject disclosure.

With regard to FIG. 2, illustrated therein is a system 200 for ensuring correctness of session identifiers in call duration records in mobile networks, in accordance with various embodiments set forth and disclosed herein. As illustrated, system 200 depicts a charging device 102 that can comprise comparator engine 202 coupled to a processor 204, memory 206, and storage 208. Comparator engine 202 can be in communication with processor 204 for facilitating operation of computer or machine executable instructions and/or components by comparator engine 202, memory 206 for storing data and/or the computer or machine executable instructions and/or components, and storage 208 for providing longer term storage of data and/or machine and/or computer readable instructions. Additionally, system 200, and more specifically charging device 102, can also receive input 210 for use, manipulation, and/or transformation by comparator engine 202 to: produce one or more useful, concrete, and tangible result; and/or transform one or more articles to different states or things. Further, system 200, and in particular charging device 102, can also generate and output the useful, concrete, and tangible results and/or the transformed one or more articles produced by comparator engine 202 and output the useful, concrete, and tangible results and/or the transformed one or more articles as output 212.

As noted above, system 200, for purposes of exposition, can be any type of machine, mechanism, device, facility, apparatus, and/or instrument that includes a processor and/or is capable of effective and/or operative communication with a wired and/or wireless network topology. Illustrative mechanisms, machines, apparatuses, devices, facilities, and/or instruments that can comprise system 200 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

As noted above, system 200, and in particular charging device 102, can comprise comparator engine 202 that, based on charging device 102 being in communication with a first device (e.g., first user equipment device 104) and/or a second device (e.g., second user equipment device 106) and as a consequence of the first device having. for example, initiated a first communication session with the second device that was rejected with a SIP error code and thereafter, within a defined or definable time duration, initiated a second communication session with the second device that has been, for example, directed to a voicemail service operational on an application server device, can determine whether or not the outgoing-session ID values of the first communication session matches with the second communication session. Comparator engine 202 can compare a first call identifier (e.g., Call-ID1) that can have been received as first input (e.g., input 210) formatted as a first ACR comprising a first outgoing-session-ID AVP for a first SIP session (e.g., from the first device when the first device initiated the rejected first communication session with the second device) with a second call identifier (e.g., Call-ID2) that can have been received as second input (e.g., input 210) formatted as a second ACR comprising a second outgoing-session-ID AVP for a second SIP session (e.g., from the first device when the first device initiated the second communication session with the second device that was subsequently directed to the voicemail service operational on the application server device).

Comparator engine 202, in response to determining there is a mismatch between the first outgoing-session-ID AVP for the first SIP session and the second outgoing-session-ID AVP for the second SIP session can note the error and thereafter populate an ACA acknowledgment response with a diameter error, such as DIAMETER_INVALID_SESSION_ID. Additionally, comparator engine 202 can also add the value that was expected in an error message AVP, wherein the error message AVP can be stored to a database device associated with a collection of distributed database devices.

Figure 3:
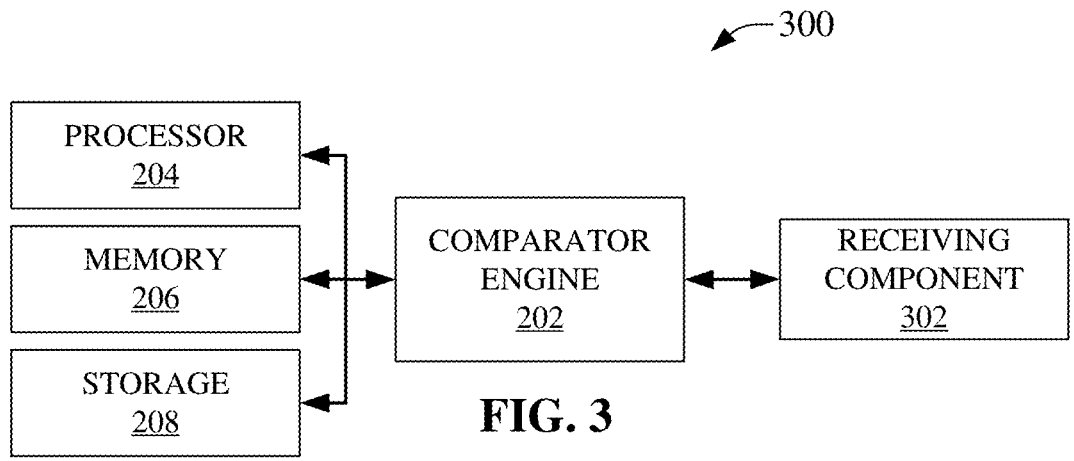
FIG. 3 provides illustration of an additional system for ensuring correctness of session identifiers in call duration records in mobile networks, in accordance with aspects of the subject disclosure.

FIG. 3 depicts further illustration of system 200, now denoted as system 300 for ensuring correctness of session identifiers in call duration records in mobile networks, in accordance with one or more embodiments described and set forth herein. System 300 provides further illustration of charging device 102 that can comprise receiving component 302 coupled to comparator engine 202, which in turn can be operative communication with processor 204, memory 206, and/or storage 208. Receiving component 302, as a function of charging device 102 being in communication with a first device (e.g., first user equipment device 104) and/or a second device (e.g. second user equipment device 106), can receive a first call identifier (e.g., Call-ID1) that can have been received as a first input formatted as a first ACR comprising a first outgoing-session-ID AVP for a first SIP session. Additionally, receiving component 302 can also receive a second call identifier (e.g., Call-ID2) that can have been received as a second input formatted as a second ACR comprising a second outgoing-session-ID AVP for a second SIP session.

As has been noted above, in accordance with various embodiments, the second call identifier can have been received by receiving component 302 as a function of a failure of the first device to establish a communication session with the second device. For example, the first device, in response to attempting to establish a communication session with the second device using the first call identifier (Call-ID1) can receive an error message (e.g., error code 486) indicating that the second device is unavailable/unable to establish the communication session. When the error message is received by the first device the communication session can be forwarded to a voicemail service that can be operational on an application server device, wherein the communication session can be associated with a second disparate call identifier (Call-ID2). Alternatively, and/or additionally, when the error message is received by the first device, the first device can attempt, within a defined or definable time period, to establish a further communication session with the second device using the second call identifier (Call-ID2).

Figure 4:
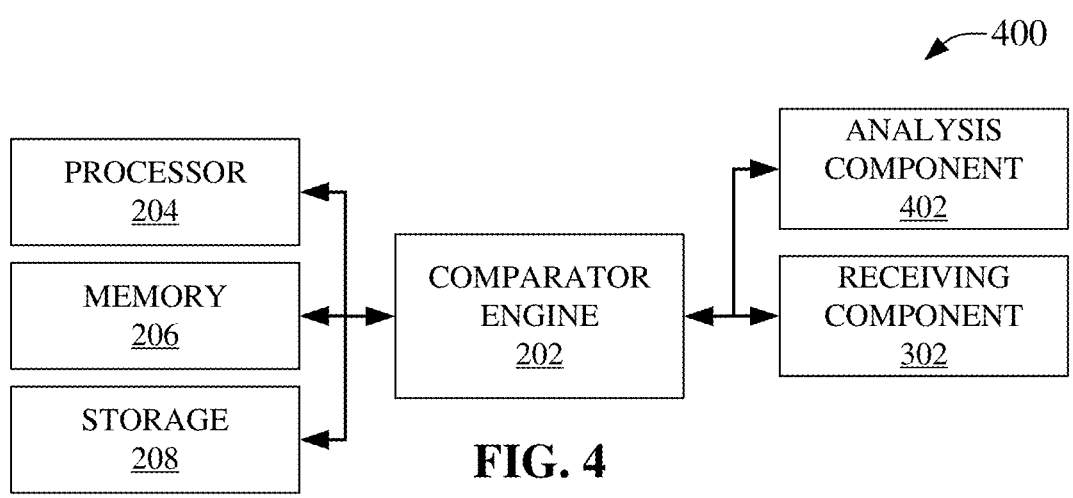
FIG. 4 provides illustration of an additional system for ensuring correctness of session identifiers in call duration records in mobile networks, in accordance with aspects of the subject disclosure.

FIG. 4 provides further illustration of system 200, now denoted as system 400 for ensuring correctness of session identifiers in call duration records in mobile networks, in accordance with embodiments set forth and described herein. As depicted, system 400 can include analysis component 402, that can utilize the functionalities and/or facilities provided with receiving component 302, comparator engine 202, processor 204, memory 206, and/or storage 208. Analysis component 402 can compare the first call identifier that can have received as a first ACR comprising a first outgoing-session-ID AVP for a first SIP session with a second call identifier that can have been received as a second ACR comprising a second outgoing-session-ID AVP for a second SIP session. Analysis component 402 can determine whether the first outgoing-session-ID AVP for the first SIP session matches the second outgoing-session-ID AVP for the second SIP session.

Figure 5:
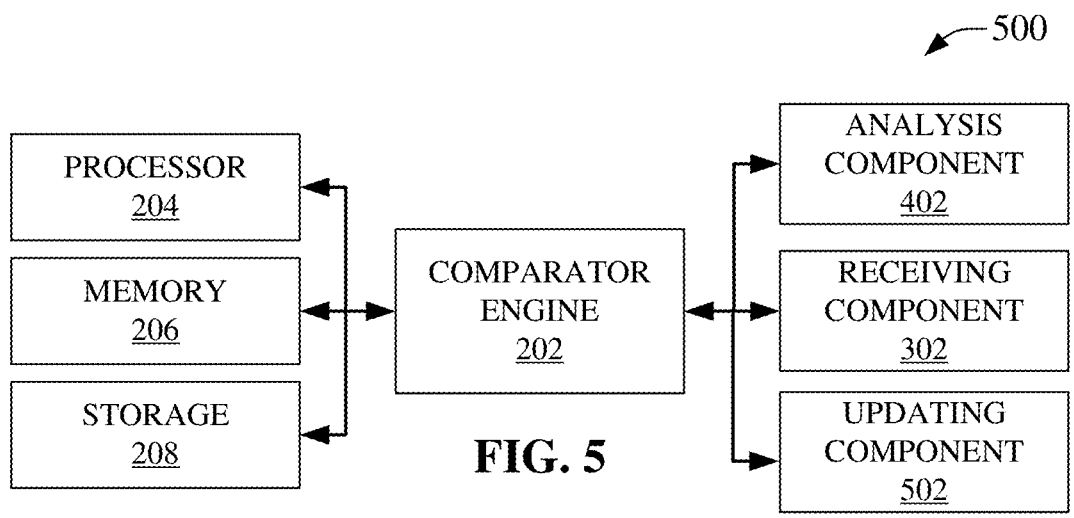
FIG. 5 provides illustration of an additional system for ensuring correctness of session identifiers in call duration records in mobile networks, in accordance with aspects of the subject disclosure.

FIG. 5 is an additional illustration of system 200, now depicted as system 500 for ensuring correctness of session identifiers in call duration records in mobile networks, in accordance with various embodiments set forth and disclosed herein. As illustrated, system 500 can include updating component 502 that, in conjunction with one or more functionalities and/or facilities provided by analysis component 402, receiving component 302, comparator engine 202, processor 204, memory 206, and/or storage 208 can, based on analysis component 402 identifying a mismatch between the values of the first outgoing-session-ID AVP for the first SIP session and the second outgoing-session-ID AVP for the second SIP session can note the error and thereafter populate the ACA acknowledgment response with a diameter error, such as DIAMETER_INVALID_SESSION_ID. Additionally, and/alternatively, updating component 502 can add the value that was expected in an error message AVP, wherein the error message AVP can be stored to a database device associated with an aggregation of distributed database devices.

Figure 6:
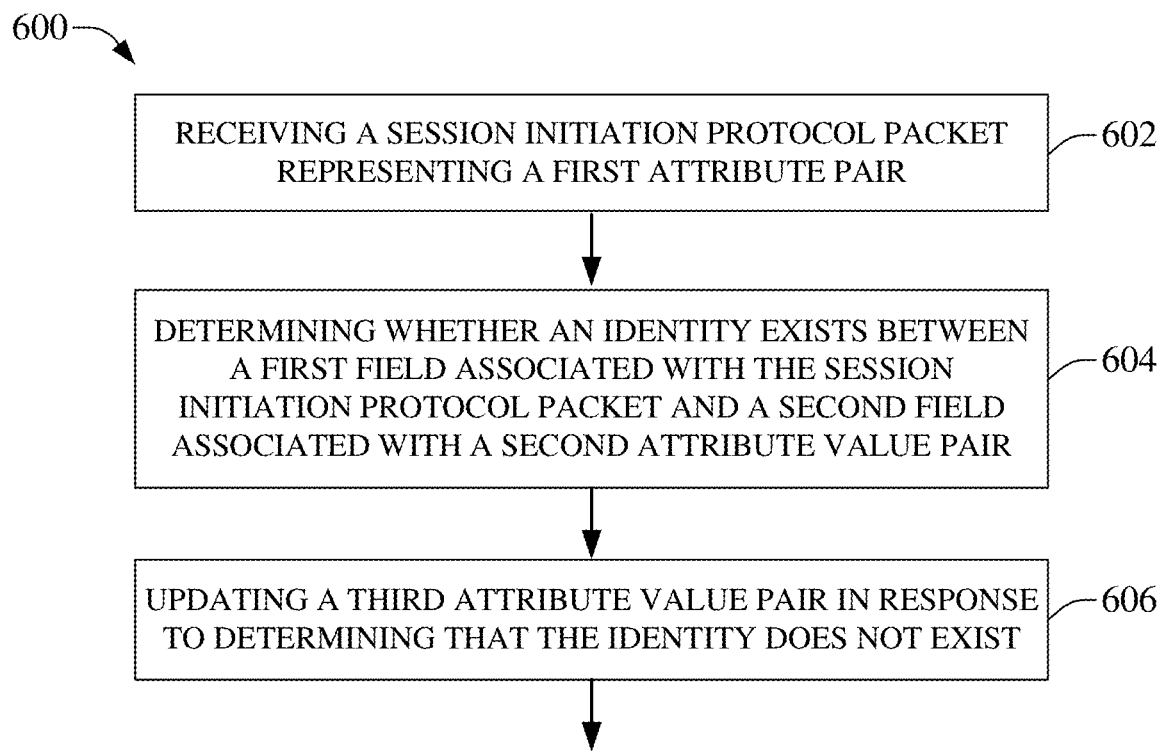
FIG. 6 provides illustration of a flow or method for ensuring correctness of session identifiers in call duration records in mobile networks, in accordance with aspects of the subject disclosure.
Figure 7:
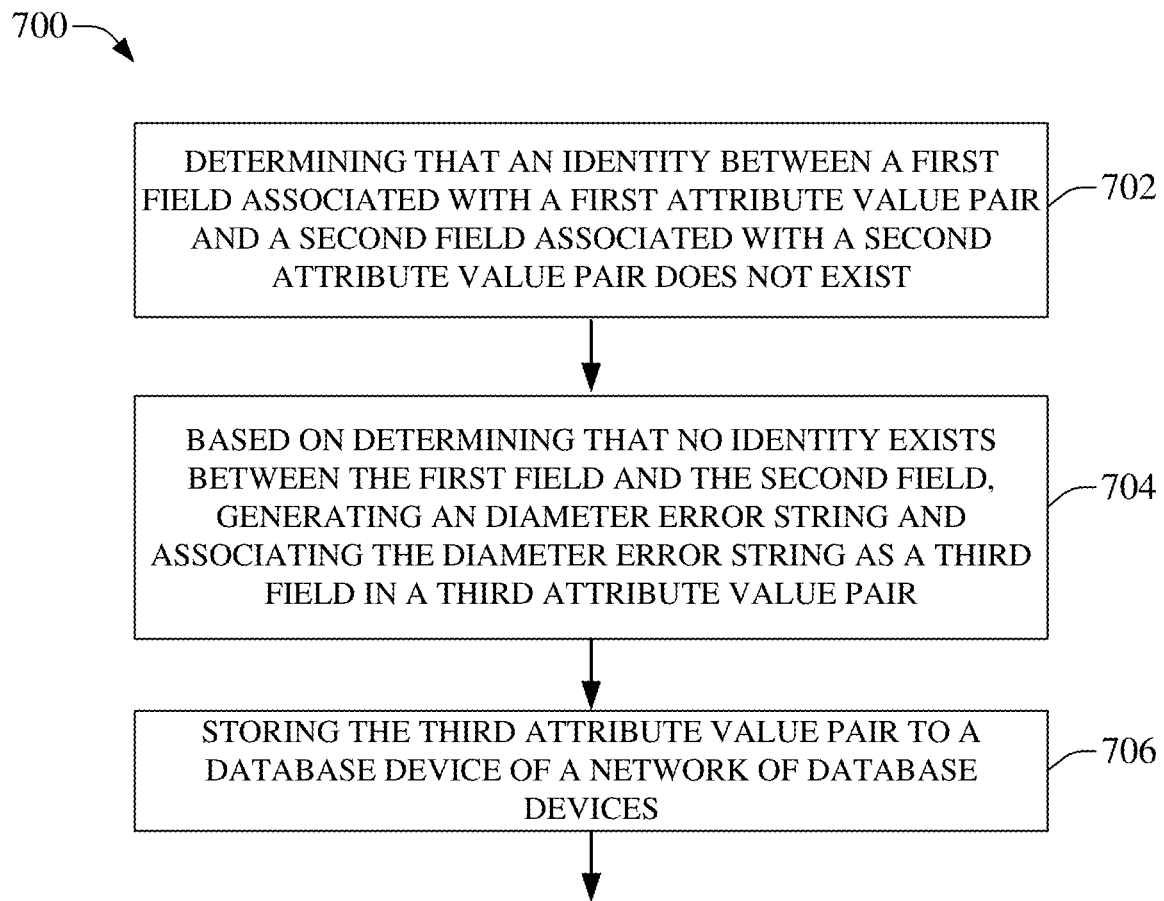
FIG. 7 provides illustration of an additional flow or method for ensuring correctness of session identifiers in call duration records in mobile networks, in accordance with aspects of the subject disclosure.
Figure 8:
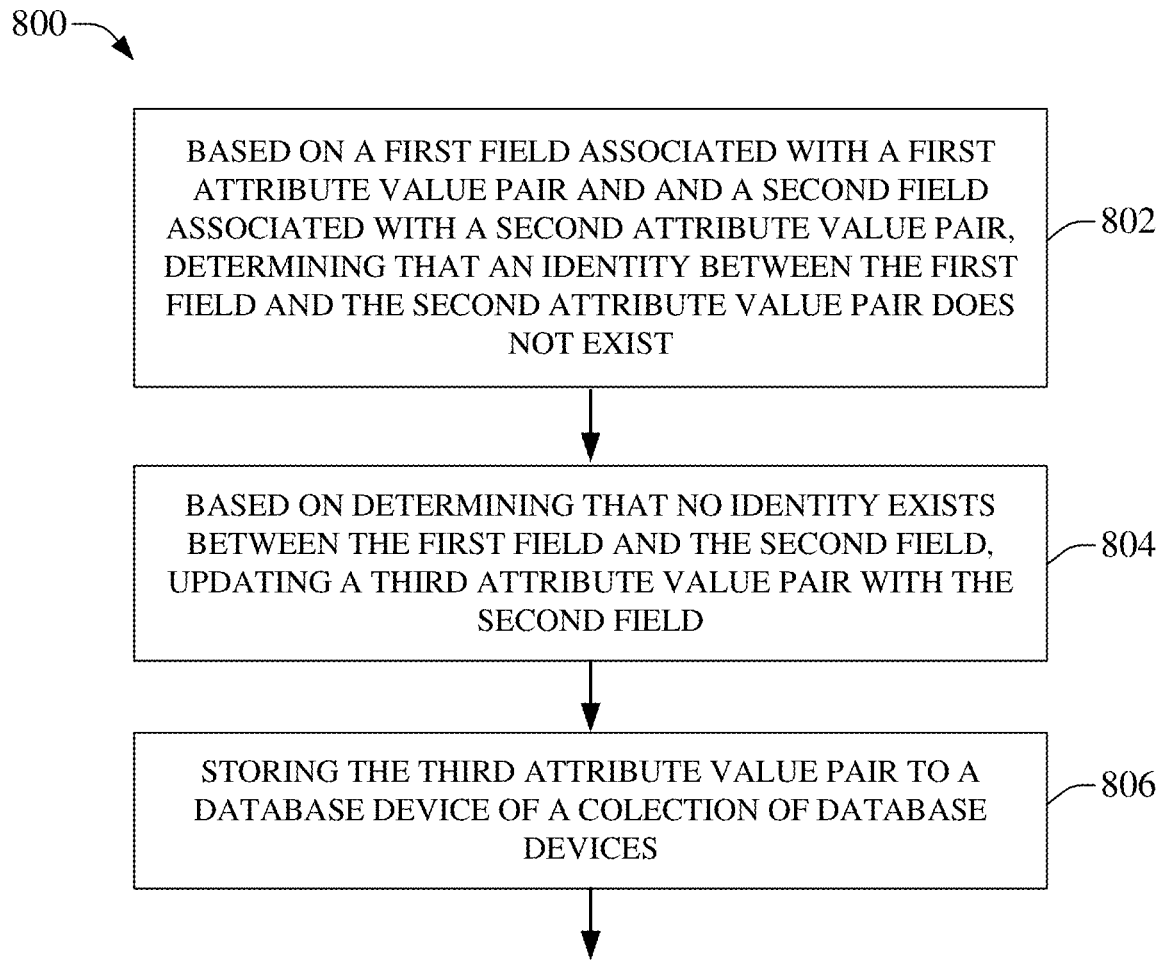
FIG. 8 provides illustration of an additional flow or method for ensuring correctness of session identifiers in call duration records in mobile networks, in accordance with aspects of the subject disclosure.

In view of the example system(s) described above, example method(s) that can be implemented in accordance with the disclosed subject matter can be better appreciated with reference to flowchart in FIGS. 6-8. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a flow, method, or timing chart 600 for ensuring correctness of session identifiers in call duration records in mobile networks, in accordance with various embodiments set forth and disclosed herein. Flow, method, or timing chart 600 can commence at 602 wherein charging device 102 can receive a session initiation protocol packet representing a first attribute value pair. At 604, charging device 102 can determine whether an identity exists between a first field associated with the session initiation protocol packet and a second field associated with a second attribute value pair. At 606, charging device 102 can update a third attribute value pair in response to determining that an identity does not exist.

FIG. 7 depicts a flow, method, or timing chart 700 for ensuring correctness of session identifiers in call duration records in mobile networks, in accordance with one or more embodiments set forth and disclosed herein. Flow, method, or timing chart 700 can commence at 702 wherein charging device 102 can determine that an identity between a first field associated with a first attribute value pair and a second field associated with a second attribute value pair does not exist. At 704, charging device 102 can, based on determining that no identity exists between the first field and the second field, can generate a diameter error string and can associate the diameter error string as a third field in a third attribute value pair.

FIG. 8 illustrates an additional flow, method, or timing chart 800 for ensuring correctness of session identifiers in call duration records in mobile networks, in accordance with various embodiments set forth and described herein. Flow, method, or timing chart 800 can commence at 802 wherein charging device 102, based on a first field associated with the first attribute value pair and a second field associated with a second attribute value pair, can determine that an identity between the first field and the second field does not exist. At 804, charging device 102, based on determining that no identity exists between the first field and a second field, can update a third attribute value pair with a second field. At 806, charging device 102 can store the third attribute value pair to a database device of a grouping of database devices.

In accordance with the foregoing the subject disclosure, in various embodiments the disclosure describes a device, comprising: a processor; and a memory that stores executable instructions that, when executed by the processor, facilitate performance of operations. The operations can comprise: receiving a session initiation protocol packet representing a first attribute value pair; based on the session initiation protocol packet, determining whether an identity, or a match, exists between a first field associated with the session initiation protocol packet and a second field associated with a second attribute value pair; in response to determining that the identity, or the match, does not exist between the first field and the second field, updating a third attribute value pair; and facilitating storage of the third attribute value pair to a database device of database devices.

The receiving of the session initiation protocol packet can comprise receiving the session initiation protocol packet from a user equipment device, wherein when the session initiation protocol packet is a first session initiation protocol packet, the operations further comprise receiving a second session initiation protocol packet representative of the second attribute value pair. The first field associated with the session initiation protocol packet can represent a call identifier string associated with a user equipment device. The second field associated with the second attribute value pair can represent a call identifier string associated with a network device of a group of network devices, wherein the network device of the group of network devices can execute a voicemail application service. The third attribute value pair can comprise an error string representative of a failure to determine that the identity, or match, exists between the first field and the second field.

In additional and/or alternative embodiments, the disclosure provides a method, comprising: in response to receiving a session initiation protocol packet comprising a first attribute value pair, determining, by a device comprising a processor, an identity, or match, between a first field associated with the session initiation protocol packet and a second field associated with a second attribute value pair; and in response to determining, based on the session initiation protocol packet, that no identity, or no match, exists between the first field and the second field, updating, by the device, a third attribute value pair.

The receiving the session initiation protocol packet comprises receiving the session initiation protocol packet from a user equipment device, wherein when the session initiation protocol packet is a first session initiation protocol packet, receiving, by the device, a second session initiation protocol packet can comprise the second attribute value pair. The first field can be associated with the session initiation protocol packet comprises a call identifier string associated with a user equipment device. The second field associated with the second attribute value pair can comprise a call identifier string associated with a network device of a group of network devices, wherein the network device of the group of network devices can execute a voicemail application service. The third attribute value pair can comprise an error string representative of a failure to determine whether the identity, or the match, exists between the first field and the second field.

In additional and/or alternative embodiments, disclosure is made of a computer-readable storage medium and/or machine-readable storage medium, comprising executable instructions that, when executed by the processor, facilitate performance of operations, comprising: receiving a session initiation protocol packet representing a first attribute value pair; based on the session initiation protocol packet, checking for an existence of an identity, or match, between a first field associated with the session initiation protocol packet and a second field associated with a second attribute value pair; and in response to a result of the checking being that the existence of the identity, or the match, is not determined to be present between the first field and the second field, updating a third attribute value pair. The receiving of the session initiation protocol packet can comprise receiving the session initiation protocol packet from a user equipment device. Additionally, when the session initiation protocol packet is a first session initiation protocol packet, and the operations further can comprise receiving a second session initiation protocol packet comprising the second attribute value pair. Further, the first field associated with the session initiation protocol packet can comprise a call identifier string associated with a user equipment device.

Figure 9:
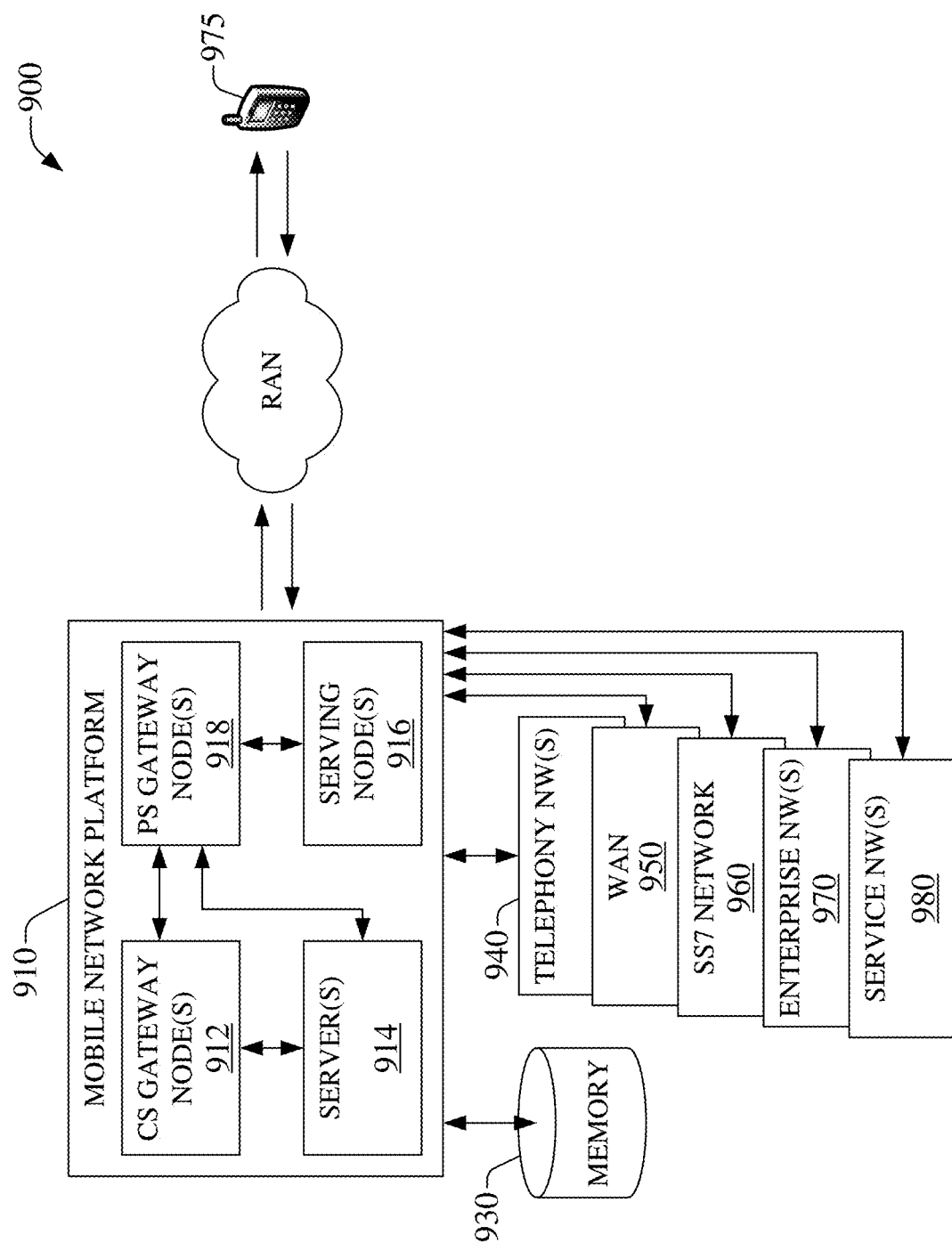
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
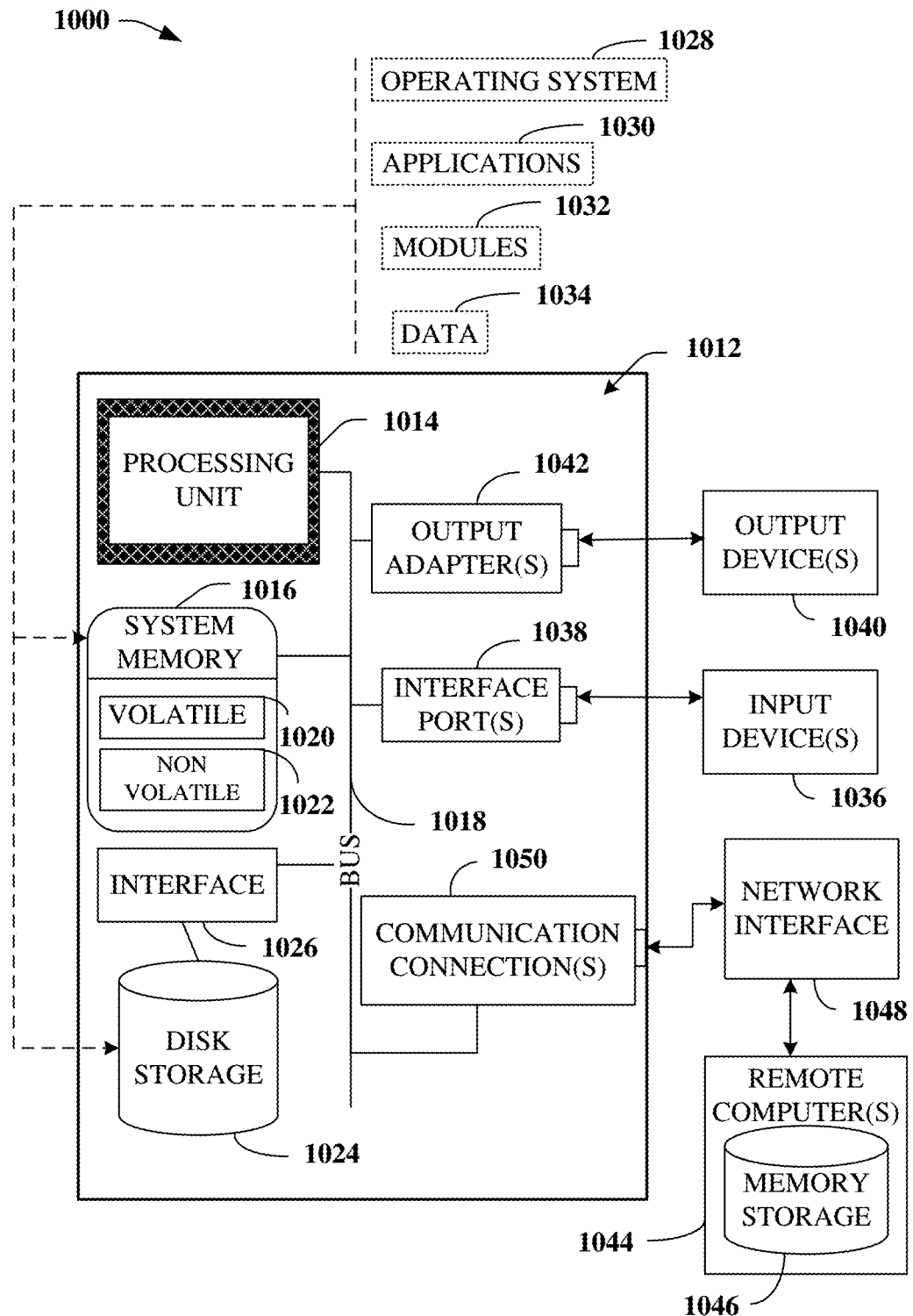
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smart phone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   receiving a first session initiation protocol packet representing a first attribute value pair;
   based on the first session initiation protocol packet, determining whether a match exists between a first field associated with the first session initiation protocol packet and a second field associated with a second attribute value pair, wherein the second attribute value pair is included in a second session initiation protocol packet, and wherein the second session initiation protocol packet is received within a defined time period measured from the receiving of the first session initiation protocol packet and after receiving the first session initiation protocol packet; and
   in response to determining that the match does not exist between the first field and the second field, updating a third attribute value pair, wherein the third attribute value pair comprises a third field representing an expected value that equates to a value of the second field, and wherein the expected value was received in an earlier session initiation protocol packet received prior to the first session initiation protocol packet.

2. The device of claim 1, wherein the receiving of the first session initiation protocol packet comprises receiving the first session initiation protocol packet from a user equipment device.

3. The device of claim 2, wherein the operations further comprise receiving the second session initiation protocol packet from a network device of a group of network devices.

4. The device of claim 2, wherein the earlier session initiation protocol packet is received from the user equipment device.

5. The device of claim 1, wherein the first field associated with the first session initiation protocol packet represents a call identifier string associated with a user equipment device.

6. The device of claim 1, wherein the second field associated with the second attribute value pair represents a call identifier string associated with a network device of a group of network devices.

7. The device of claim 6, wherein the network device of the group of network devices executes a voicemail application service.

8. The device of claim 1, wherein the third attribute value pair further comprises an error string representative of a failure to determine that the match exists between the first field and the second field.

9. The device of claim 1, wherein the operations further comprise facilitating storage of the third attribute value pair to a database device of database devices.

10. A method, comprising:
in response to receiving a first session initiation protocol packet comprising a first attribute value pair, determining, by a device comprising a processor, whether a first field associated with the first session initiation protocol packet matches a second field associated with a second attribute value pair, wherein the second attribute pair is included in a second session initiation protocol packet, and wherein the second session initiation protocol packet is received prior to expiration of a definable time period measured from the receiving of the first session initiation protocol packet; and
in response to the determining, based on the first session initiation protocol packet, indicating that the first field does not match the second field, updating, by the device, a third attribute value pair with a field representative of an expected value that matches a value of the second field, wherein the expected value was received in an earlier session initiation protocol packet.

11. The method of claim 10, wherein the receiving the first session initiation protocol packet comprises receiving the first session initiation protocol packet from a user equipment device.

12. The method of claim 11, further comprising receiving, by the device, the second session initiation protocol packet from a network device of a grouping of networked devices.

13. The method of claim 10, wherein the first field associated with the first session initiation protocol packet comprises a call identifier string associated with a user equipment device.

14. The method of claim 10, wherein the second field associated with the second attribute value pair comprises a call identifier string associated with a network device of a grouping of networked devices.

15. The method of claim 14, wherein the network device of the grouping of networked devices executes a voicemail application service.

16. The method of claim 10, wherein the third attribute value pair further comprises an error string representative of a failure to determine whether the first field matches the second field.

17. A non-transitory machine-readable storage medium, comprising executable instructions that, when executed by a processor, facilitate performance of operations, comprising:
receiving a first session initiation protocol packet including a first attribute value pair;
in response to receiving the first session initiation protocol packet, checking for an existence of a match between a first field associated with the first session initiation protocol packet and a second field associated with a second attribute value pair, wherein the second attribute value pair is included in a second session initiation protocol packet, and wherein the second session initiation protocol packet is received within a defined time period determined as a function of the receiving of the first session initiation protocol packet; and
in response to a result of the checking being that the match between the first field and the second field is not determined to be present, updating a third attribute value pair with a field that represents an expected value that is equal to a value of the second field, wherein the expected value was received in an earlier session initiation protocol packet and prior to the first session initiation protocol packet.

18. The non-transitory machine-readable storage medium of claim 17, wherein the receiving the first session initiation protocol packet comprises receiving the first session initiation protocol packet from a user equipment device.

19. The non-transitory machine-readable storage medium of claim 17, wherein the operations further comprise receiving the second session initiation protocol packet from a device of a group of devices.

20. The non-transitory machine-readable storage medium of claim 17, wherein the first field associated with the first session initiation protocol packet comprises a call identifier string associated with a user equipment device.

\* \* \* \* \*